United States Patent [19]

Raiha

[11] Patent Number: 4,991,306
[45] Date of Patent: Feb. 12, 1991

[54] TACTILE CENTER LOCATOR

[76] Inventor: Antti P. Raiha, 8425 Sunnyside Rd., Sandpoint, Id. 83864

[21] Appl. No.: 542,894

[22] Filed: Jun. 25, 1990

[51] Int. Cl.$^5$ .................... G01D 21/00; B23B 49/00
[52] U.S. Cl. .................................... 33/520; 33/644; 33/642; 408/75
[58] Field of Search ............... 33/644, 632, 638, 642, 33/558.4, 520, DIG. 18; 408/75, 16

[56] References Cited

U.S. PATENT DOCUMENTS

| | | | |
|---|---|---|---|
| 990,605 | 4/1911 | Stimson | 33/642 |
| 1,141,396 | 6/1915 | Jubinville | 33/642 |
| 1,444,080 | 2/1923 | Nyman | 33/638 |
| 1,524,980 | 2/1925 | Krebs | 33/642 |
| 2,074,990 | 3/1937 | Roberts | 33/642 |
| 2,645,024 | 7/1953 | Pool, Jr. | 33/642 |
| 2,674,045 | 4/1954 | Lakomski | 33/520 |
| 2,718,706 | 9/1955 | Kuslisch | 33/DIG. 18 |
| 2,779,040 | 1/1957 | Scarff | 33/644 |
| 2,994,131 | 8/1961 | Gaylord | 33/520 |
| 3,079,694 | 3/1963 | Yemmans | 33/642 |

*Primary Examiner*—Thomas B. Will
*Attorney, Agent, or Firm*—Fred Flam

[57] ABSTRACT

The center locator utilizes a probe mounted for limited universal movement by a ball and socket arrangement. The center locator is affixed to the machine tool spindle so that the center of the ball coincides with the axis of the machine tool spindle. One end of the probe, provided, for example, with a sharp point, is placed in registry with a punch mark or pilot hole. The other end of the probe cooperates with two orthogonally located sensors. Each sensor includes a plunger confined for rectilinear movement by a hollow calibration nut, the plunger of one sensor being movable in the X direction in a plane at right angles to the spindle axis, and the plunger of the other sensor being movable in the Y direction in said plane. Springs cause the plungers to maintain contact with the probe end to follow the probe end along the X and Y axes respectively. The ends of the plungers are flat and move inwardly and outwardly of correspondingly flat tactile ends of the calibration nuts as the probe tilts in its mounting. When the work contacting end of the probe is precisely in line with the spindle axis, the plungers are precisely flush with the flat ends of the calibration nuts. A flush or lack of flush relationship is readily sensed by touch. The work is moved in the X-Y plane until the flush relationship is verified.

7 Claims, 3 Drawing Sheets

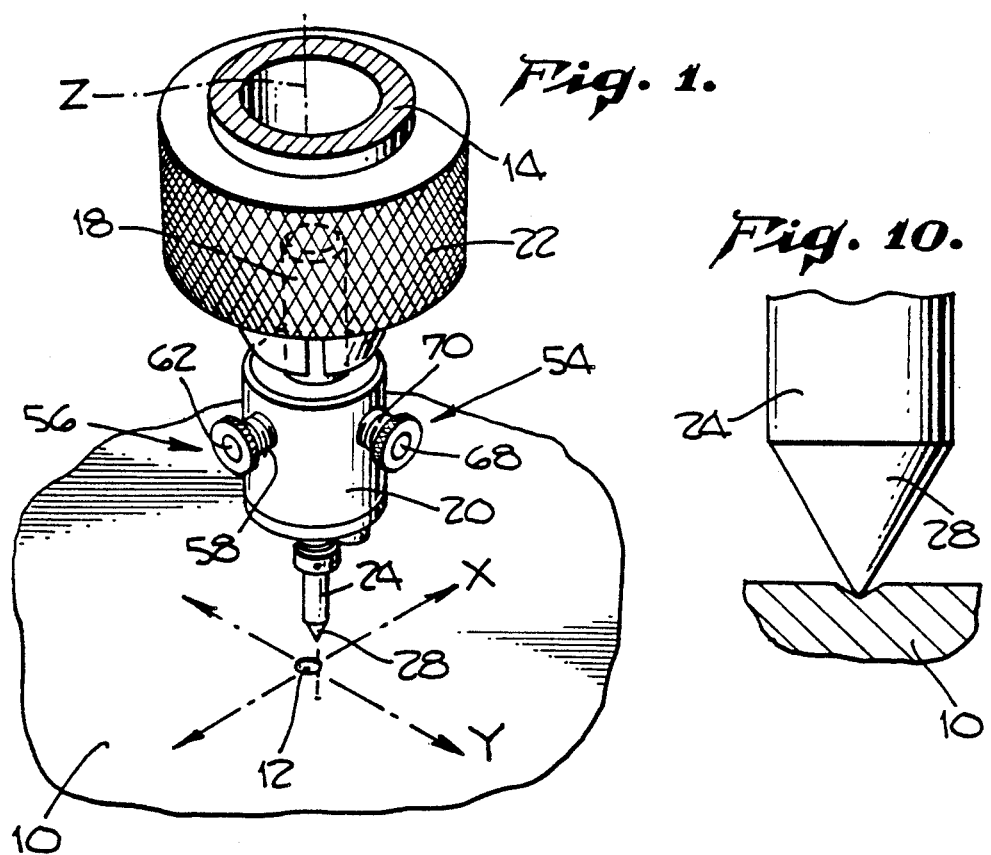
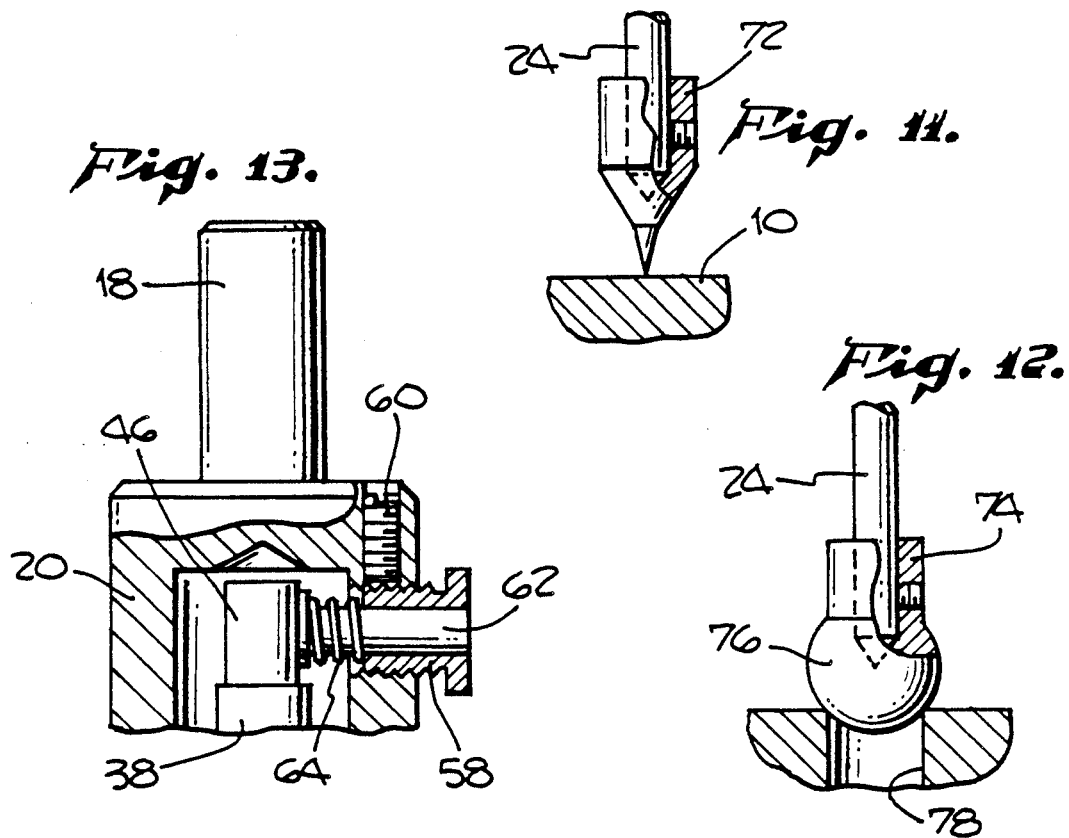

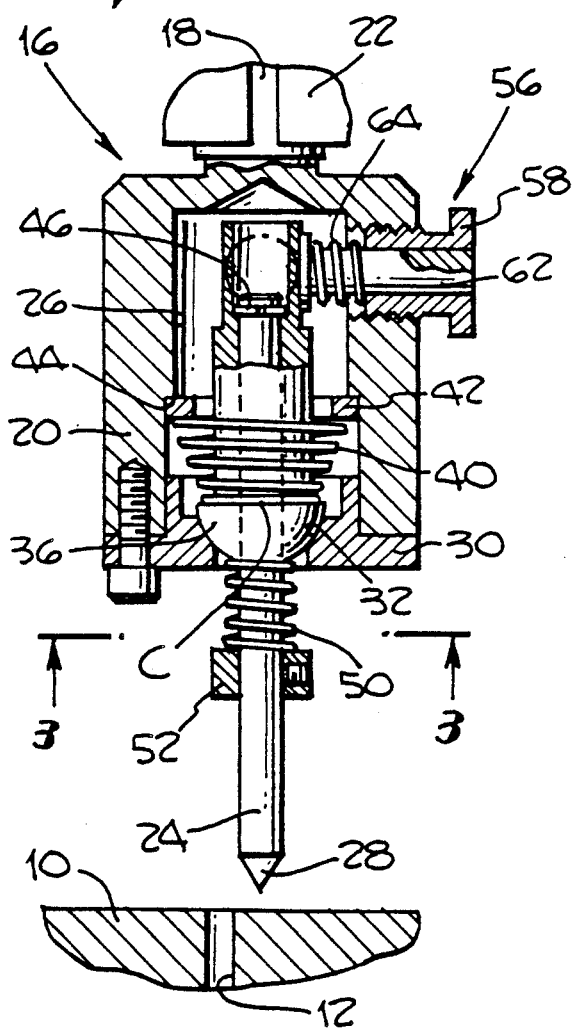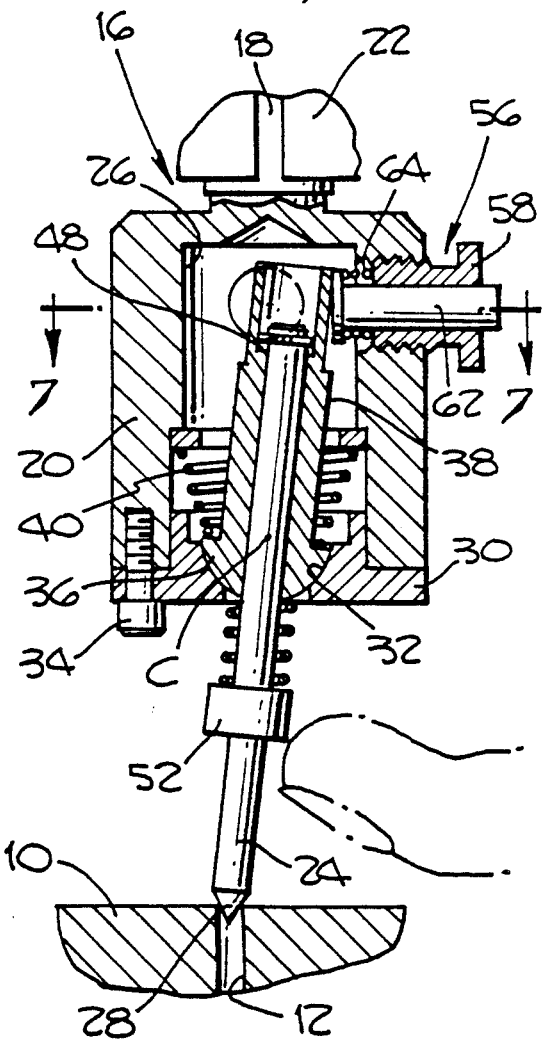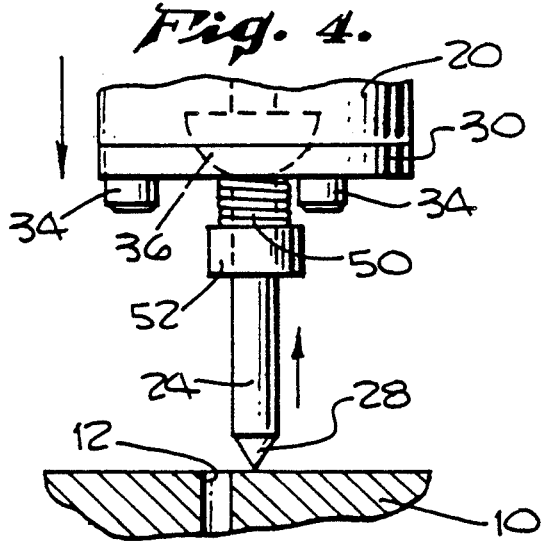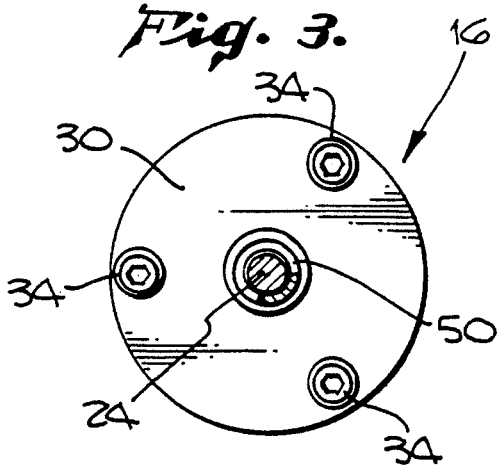

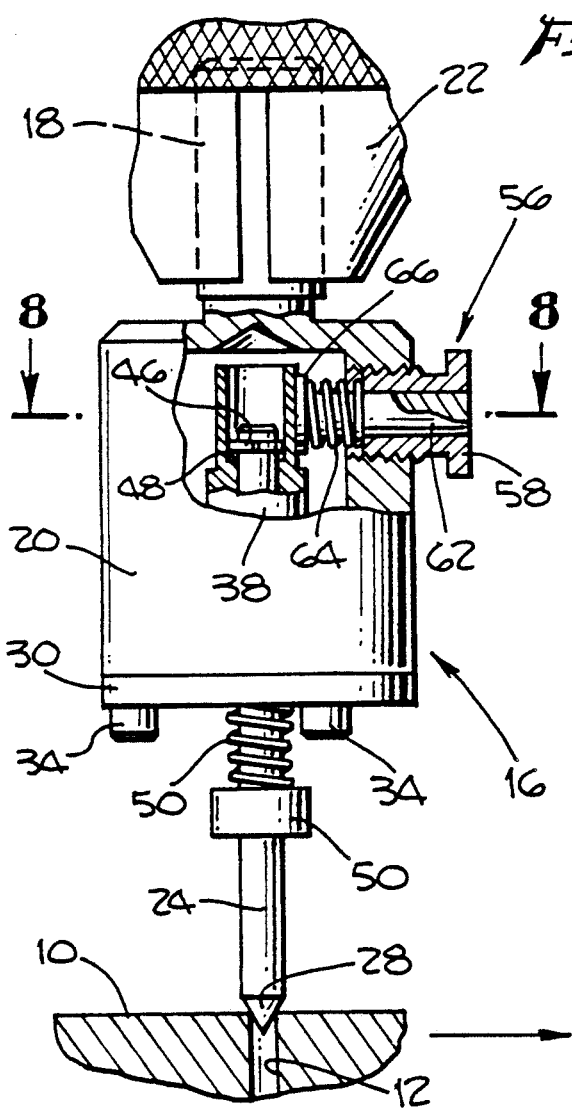
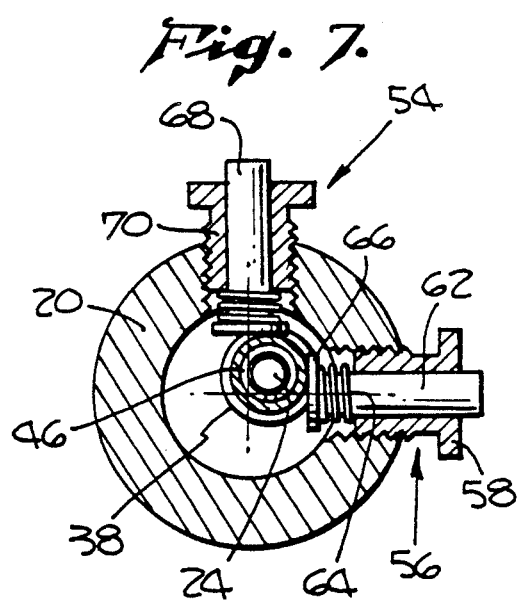
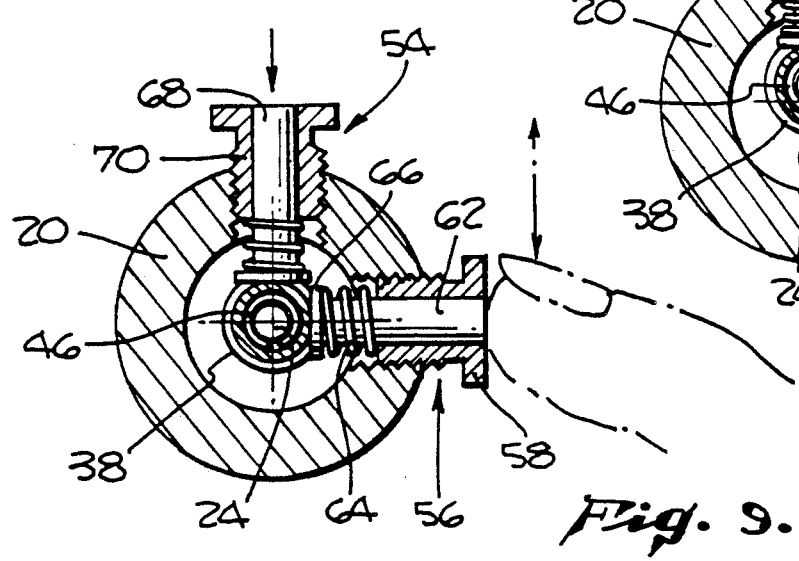

4,991,306

TACTILE CENTER LOCATOR

FIELD OF INVENTION

This invention relates to accessories for machine tools, and particularly to a gauge for aligning the spindle of a rotary tool with reference point marked on the work.

BACKGROUND OF THE INVENTION

Approximate alignment of a machine tool spindle with the mark on the work may be achieved by lowering the spindle and tool to the work, observing the alignment or lack of alignment, and adjusting the work or work table relative to the spindle. The problem, however, is that the tool obscures the view of the cross hair, pilot hole or other marking, and close alignment is rarely achieved. Various implements have been devised for solving the problem. One of these is an optical system shown and described in my U.S.A. Pat. No. 4,438,567 issued Mar. 27, 1984 and entitled Center Locator for Alignment of Work to Machine Spindle. An image is projected upon the work while the critical area of the work is unobscured.

The object of the present invention is to provide a new and novel center locator in which alignment is achieved without requiring observation of the reference point. Still another object of the present invention is to provide a center locator that utilizes the delicate sense of touch rather than the sense of sight to determine optimum alignment. Still another object of the present invention is to provide a center locator that is basically simple in construction, hence affordable. Still another object of the present invention is to provide a center locator that is easily calibrated.

This invention possesses many other advantages, and has other objects which may be made more clearly apparent from a consideration of the embodiments of the invention shown and described.

SUMMARY OF INVENTION

In order to accomplish the foregoing objectives, I provide a probe that is mounted for limited universal movement by a ball and socket arrangement. The center of the ball coincides with the axis of the machine tool spindle. One end of the probe is placed in registry with a punch mark, pilot hole or the like. For this purpose, the probe end can be sharply pointed. The other end of the probe cooperates with two orthogonally located sensors. Each sensor includes a plunger confined for rectilinear movement by a hollow calibration nut, the plunger of one sensor being movable in the X direction in a plane at right angles to the spindle axis, and plunger of the other sensor being movable in the Y direction in said plane. Springs cause the inner ends of plungers to maintain contact with the probe end to reflect the components of movement of the probe end in the X and Y directions respectively.

The remote or outer ends of the plungers move inwardly and outwardly of bearings in the form of calibration nuts. The end surfaces of the calibration nuts and the corresponding ends of the plungers are flat, or have corresponding curvatures. When the work contacting end of the probe is precisely in line with the spindle axis, the plungers are precisely flush with the end surfaces of the calibration nuts. If the probe is not in line, a lack of flush relationship is readily sensed by touch. The work is moved in the X-Y plane until the flush relationship sensed by touch.

BRIEF DESCRIPTION OF THE DRAWINGS

A detailed description of the invention will be made with reference to the accompanying drawings wherein like numerals designate corresponding parts in the several figures. These drawings are true scale.

FIG. 1 an oblique view from above, illustrating the center locator clamped to a tool quill. Also shown in FIG. 1 is a segment of a work piece.

FIG. 2 is a longitudinal sectional view of the center locator and work piece preparatory to alignment.

FIG. 3 is a transverse sectional view of the center locator taken along a plane corresponding to line 3—3 of FIG. 2.

FIG. 4 is an elevational view of the locator and work piece showing the relationship of these parts upon movement of the quill towards the work piece.

FIG. 5 is a sectional view similar to FIG. 2, illustrating the position of the parts upon movement of the probe into registry with the mark.

FIG. 6 is an elevational view of the center locator after alignment in one plane has been achieved. A portion of the apparatus is broken away and shown in section.

FIG. 7 is a transverse sectional view taken along a plane corresponding to line 7—7 of FIG. 5.

FIGS. 8 and 9 are sectional views similar to FIG. 7, but showing the parts in the different positions as alignment is achieved.

FIGS. 10, 11 and 12 are enlarged fragmentary elevational views showing the use of different probe heads for use with a punch mark, cross hairs and a hole, respectively.

FIG. 13 is a fragmentary elevational view showing how the locator may be calibrated. A portion of the apparatus is broken away and shown in section.

DETAILED DESCRIPTION OF THE PREFERRED EMBODIMENT

The following detailed description is of the best presently contemplated mode of carrying out the invention. This description is not to be taken in a limiting sense, but is made merely for purposes of illustrating the general principles of the invention, the scope of the invention being defined by the appended claims.

A piece of work 10 to be machined (FIG. 1) is placed upon a machine bed or holder. The work 10 has a pilot hole 12 to be aligned with the spindle or quill 14 of a machine tool for further machining operations. The work 10 is movable relative to the spindle or quill 14 in a plane X-Y perpendicular to the quill or spindle axis Z so that alignment of the axis with the pilot hole 12 may be achieved. The work may be held in its aligned position by suitable releasable clamping means (not shown). In a well known manner, the quill 14 is mounted for movement along its axis Z.

In order precisely to locate the axis of the spindle or quill at the center of the pilot hole 12, a gauge or center locator 16 is provided. The locator 16 has a shank 18 at one end of its hollow body 20. The shank is clamped to a chuck 22 mounted on the quill 14 whereby the axis Z is fixed with respect to the body 20. The end of the locator body 20 opposite the shank 18 mounts a probe 24 for swivel movement about a center C that lies on the axis Z.

The probe 24 takes the form of an enlongated cylindrical rod. One part of the probe 24 projects into a deep recess 26 that opens at the end of the body 20 opposite the shank 18. The other part of the probe projects from the body 20, terminating in a tapered point 28. In a manner hereinafter to be described, the locator makes it possible to determine by touch if the point 28 is in line with axis Z, and thus if the pilot hole 12 registering with the point 28 is aligned with the machine axis Z.

The probe 24 is mounted for swivel movement by a cap 30 fitted to and registering with the end of the recess 26. The cap 20 provides an annular ball seat segment 32 having a center C aligned with the locator and machine axis Z. Screws 34 secure the cap 30 to the body 20. A semi-spherical ball 36 formed at one end of a hollow pivot shaft 38 is held seated by a compression spring 40. The spring 40 surrounds the pivot shaft 38. One end of the spring 40 engages the truncated end of the semi-spherical ball, and the outer end engages a stop washer 42 seated against an interior shoulder 44 in the recess 26.

The probe 24 is slidably mounted by the pivot shaft 38. A stop washer 46 carried at the inner end of the probe 24 opposes a shoulder 48 formed at the end of an enlargement of the pivot shaft bore thereby to limit outward movement end of the probe 24. Yet this arrangement allows limited inward movement of the probe. A compression spring 50 yieldingly urges the probe 24 to its outer limit. The spring 50 surrounds the probe 24 and at one end contacts the exposed segment of the ball 36 at the center of the seat 32 and at the other end contacts a finger piece 52 secured to the probe 24.

In order to achieve precise alignment of the pilot hole 12, the work is first approximately aligned while the locator 16 and quill or spindle are elevated from the work 10. The quill or spindle is then lowered from the position of FIG. 2 to the position of FIG. 4. In FIG. 4 the work has moved the probe 24 upwardly against the force of the spring 50, A suitable spring bias is thereby imposed upon the probe 24. By lifting the finger piece 52, the point 28 of the probe 24 may then be placed into the pilot hole 12 as shown in FIG. 5, the spring 50 now firmly seating the probe point 28 in the hole 12.

In the position of FIG. 5, the probe 24 and pivot shaft 38 are tilted so that the probe point 28 is considerably offset from the quill axis Z. Even slight misalignment may be detected and corrected. For determining misalignment, two orthogonal sensors 54 and 56 (FIG. 7) are provided. The sensor 56, for example, includes a bearing in the form of a hollow calibration nut 58. The nut 58 is screw threaded into the side of the locator body 20 at the level of the top of the pivot shaft 38. A set screw 60 (FIG. 13) locks the bearing or calibration nut 58 in position. Slidable in the bearing or calibration nut 58 is a link or plunger 62 (FIG. 5). The inner end of the plunger 62 is kept in contact with the side of the pivot shaft 38 by a small compression spring 64 that acts between the inner end of the nut 58 and a rim 66 formed at the inner end of the plunger 62. The companion sensor 54 includes a link or plunger 68, calibration nut 70 and other parts identical to those described in connection with the sensor 56. The link or plunger 68 contacts the pivots shaft 38 at a place located 90 degrees from the plunge 62.

In the far misaligned position of FIGS. 5 and 7, the outer flat ends of the links or plungers 62 and 68 project far beyond the flat ends of the corresponding calibration nuts 58 and 70. By moving the work 10 relative to the locator, the plungers 62 and 68 move correspondingly. By suitable calibration of the position of the nuts 58 and 70, precise alignment of the probe point is achieved when the flat ends of the plungers are precisely flush with the outer flat ends of the calibration nuts 58 and 70. The flush relationship or lack of flush relationship may be determined by sensitive finger tips, or alternatively, by simply moving a finger nail back and forth between the plunger end and the calibration nut. Observation of the pilot hole is unnecessary; in fact, alignment can be achieved without any dependence upon sight. The outer ends of the nuts 58 and 70 thus serve as tactile indicators.

In the position of FIG. 8, the work has been moved so that one of the links or plungers 62 is approximately flush. Next the work can be moved so that the companion plunger 68 is approximately flush. Then, as indicated in FIG. 9, delicate movements of the work can take place until both plungers are precisely flush to the touch. The desired alignment and required geometric relationship are thus verified. When precise alignment is achieved, the work is clamped in position and the machining operation may begin.

The tactile ends of the plungers and calibration nuts can have coincident curvatures instead of being precisely flat. A flush relationship can thus be sensed whether the coincident curvature is of finite radius, or of infinite radius (flat). Furthermore, a precise orthogonal relationship provides maximum sensitivity. The control plane X-Y need not be precisely perpendicular to the spindle axis as long as the nuts are properly calibrated. Three sensors can be provided instead of only two, arrayed, for example, 120° apart. In this case at least one of the links or plungers will project beyond its corresponding nut or indicator to transmit the misalignment message.

Calibration of the nuts is easily achieved by inserting a rigid tool in the chuck, holding a work piece firmly relative to the machine tool, drilling a pilot hole, for example, retracting the spindle, inserting the center locator, locating the probe in the pilot hole, adjusting the calibration nuts until all surfaces are precisely flush, and then locking the calibration nuts in position by the set screws.

For different applications, the probe 24 can be fitted with other sensors. In FIG. 10, the tapered point 28 described works well with a center punch mark. An attachment 72 (FIG. 11) may be used to provide a fine point for cooperation with cross hair marks. An attachment 74 (FIG. 12) provides a ball 76 for cooperation with a relatively large existing hole 78 in the work.

Intending to claim all novel, useful and unobvious features and combinations of features shown and/or described, I claim:

1. In a center locator cooperable with a machine tool having a machine axis;
    (a) a probe having one end registrable with a cross hair, pilot hole or other marking on a work piece;
    (b) a locator body having at one end means for releasably clamping the body to said machine tool;
    (c) said body having means spaced from said one probe end supporting said probe for swivel movement about a center aligned with said machine axis;
    (d) a plurality of links supported by said body for following the lateral movement of said probe at a place spaced from said swivel center, one of the links following the component of movement of the probe in one direction transverse to said machine axis, and another of said links following the component of movement of the probe in another direction transverse to said machine axis;

(e) a corresponding plurality of indicator members for each of said links; and (f) means guiding said links for movement along said indicator members;

(g) said links and indicators having companion surfaces that are in flush relationship when said probe is in lateral alignment with said machine axis whereby alignment of said probe end with said machine axis can be determined by touch.

2. In a center locator cooperable with a machine tool having a machine axis;

(a) a locator body having a shank at one end for releasably clamping the body to said machine tool thereby to define an axis of the body aligned with the machine axis;

(b) said body having a ball seat the center of which is located at said body axis;

(c) a hollow pivot shaft having a substantially semispherical ball;

(d) spring means maintaining said ball in contact with said seat whereby said pivot shaft is confined for swivel movement about said center;

(e) a probe slidably mounted by said pivot shaft, and having one end registrable with a cross hair, pilot hole or other marking on a work piece;

(f) spring means yieldably urging said probe in one longitudinal direction for engagement with said work piece;

(g) a plurality of indicator nuts mounted on said body in spaced angular relationship about said body axis; and (h) a corresponding plurality of plungers respectively slideable in said indicator nuts and having ends contacting said pivot shaft whereby the position of said plungers relative to their indicator nuts corresponds to the deviation of said pivot shaft and probe from alignment with said machine axis in the corresponding component direction;

(i) said plungers and nuts having companion surfaces that are in flush relationship when said shaft and probe are in alignment in the corresponding component direction whereby alignment of the work piece marking with the machine and body axis can be determined by touch.

3. The combination as set forth in claim 2 in which said indicator nuts are threadedly mounted to said body whereby said locator can be calibrated; and means locking said indicator nuts in their calibrated positions.

4. The combination as set forth in claim 2 together with a ball sensor detachably connected to said probe end for registry with a hole in said work piece.

5. In a tactile center locator cooperable with a machine tool having a machine axis:

(a) a probe having one end registrable with a cross hair, pilot hole or other marking on a work piece;

(b) a locator body having means detachably connected to a machine tool quill to define a longitudinal axis of the body;

(c) means supporting the probe for swivel movement about a center located at said body axis, said center being spaced from said one probe end;

(d) a first link supported by said body for rectilinear movements in a direction transverse to said body axis;

(e) a second link supported by said body for rectilinear movement in another direction transverse to said body axis;

(f) means causing said links to follow the tilting movement of said probe about said center so that said links are both in defined positions when said probe is aligned with said body axis; and (g) tactile means cooperable with said links for sensing when each link is in its said defined position whereby the work piece can be moved relative to said machine and body axes with the probe in registry with said marking to achieve alignment of said marking with said axes.

6. The combination as set forth in claim 5 in which said follow means comprises a plurality of bearings slidably supporting said links, together with spring means urging said links to engage said probe; said tackle means comprising end surfaces of said bearings and end surfaces of said links that are in flush relationship when said links are in said defined positions.

7. The combination as set forth in claim 5 in which said follow means comprises a plurality of hollow nuts threadedly mounted on said locator body and slidably supporting said links, together with spring means urging said links to engage said probe; said nuts having end surfaces cooperable with end surfaces of said links to comprise said tackle means, said surfaces being flush when said links are in said defined positions.

* * * * *